United States Patent [19]

Steward

[11] Patent Number: 4,993,788
[45] Date of Patent: Feb. 19, 1991

[54] HEAD-UP DISPLAY SYSTEMS
[75] Inventor: David G. Steward, Sittingbourne, England
[73] Assignee: GEC-Marconi Limited, England
[21] Appl. No.: 460,894
[22] PCT Filed: Jun. 9, 1989
[86] PCT No.: PCT/GB89/00646
  § 371 Date: Feb. 9, 1990
  § 102(e) Date: Feb. 9, 1990
[87] PCT Pub. No.: WO89/12840
  PCT Pub. Date: Dec. 28, 1989
[30] Foreign Application Priority Data
  Jun. 15, 1988 [GB] United Kingdom ............... 8814177
[51] Int. Cl.$^5$ .................. G02B 27/10; G02B 5/32
[52] U.S. Cl. .................. 350/3.72; 350/3.7; 350/174; 340/705
[58] Field of Search ............ 350/3.7, 3.72, 174, 350/172; 340/705

[56] References Cited
  U.S. PATENT DOCUMENTS
  3,940,204  2/1976  Withrington .............. 350/3.72
  4,652,870  3/1987  Steward .................. 340/705

FOREIGN PATENT DOCUMENTS
  0007039  1/1980  European Pat. Off. .
  0009332  4/1980  European Pat. Off. .
  0094816  1/1987  Japan .
  2006981  5/1979  United Kingdom ............... 350/174
  2088079  6/1982  United Kingdom .

Primary Examiner—Bruce Y. Arnold
Assistant Examiner—David R. Parsons
Attorney, Agent, or Firm—Kirschstein, Ottinger, Israel & Schiffmiller

[57] ABSTRACT

In a head-up display system of the kind utilizing a holographic combiner (17) constructed to operate at a relatively large off-axis angle and an aberration compensating optical arrangement (19) in the path between an object surface (21) at which display data originates and the combiner, the light rays from the optical arrangement are redirected upwardly onto the combiner via an arrangement (25) comprising an upper optical surface (29) having both light-reflective and light-transmissive properties and a lower fully reflective optical surface (27), the two surfaces defining a space (S) forwardly tapering in the direction of ray propagation from the object surface. In operation, rays from the object surface are reflected first at the lower surface and then reflected, in part, at the upper surface back to the lower surface where they are again reflected to the upper surface for transmission therethrough to the combiner for reflection thereby to an observer. The arrangement makes available more space for a secondary display arrangement (45) below the combiner.

10 Claims, 1 Drawing Sheet

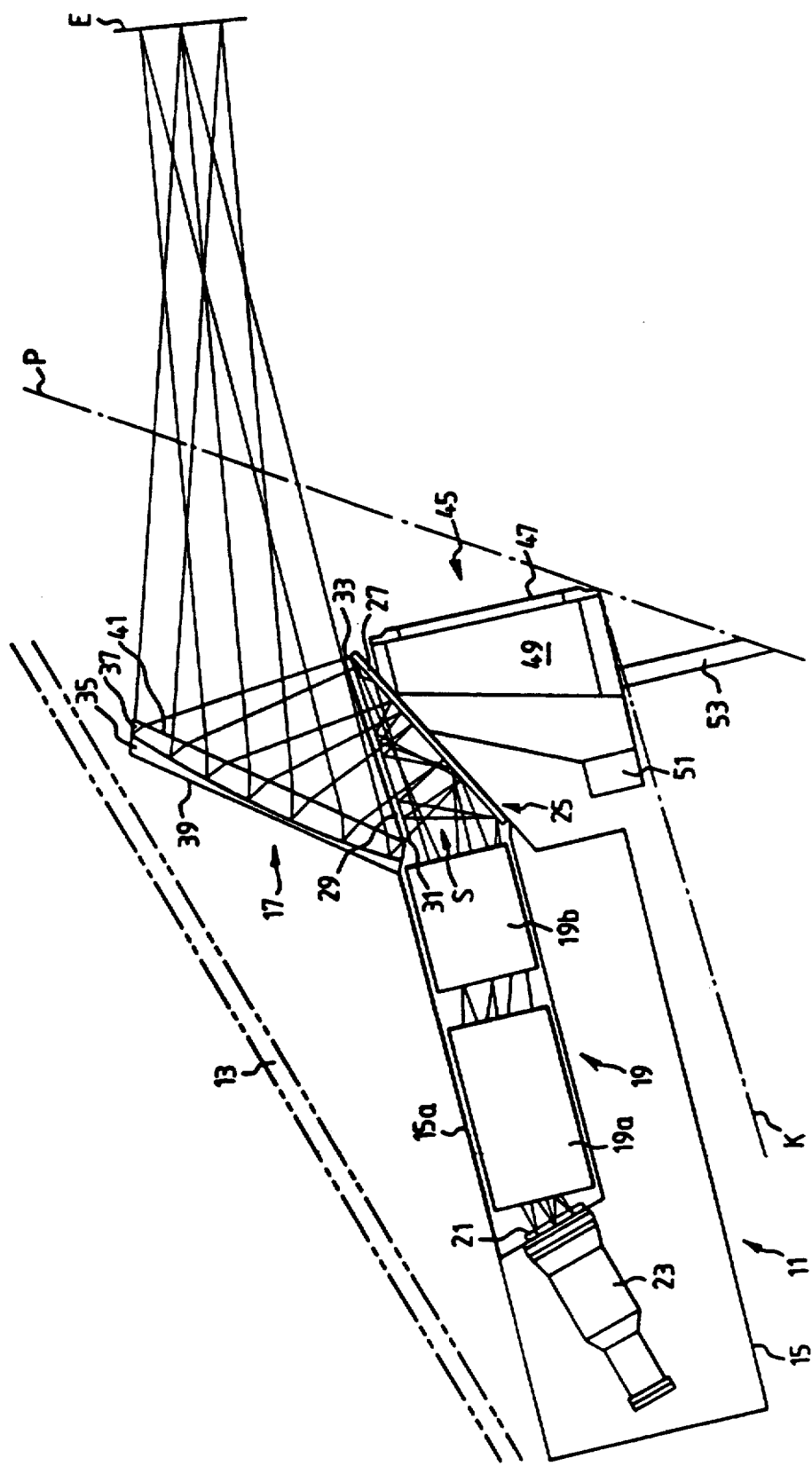

HEAD-UP DISPLAY SYSTEMS

BACKGROUND OF THE INVENTION

1. Field of the Invention

This invention relates to head-up display systems.

2. Description of Related Art

More particularly the invention relates to head-up display systems of the kind (hereinafter referred to as "head-up display systems of the kind specified") comprising: an object surface; a holographic combiner which has been constructed using two coherent sources respectively located adjacent to entrance and exit pupils of the combiner so as to deviate an axial ray coming from the object surface through an off-axis angle into an exit pupil of the system and which has a focal surface with axial coma and axial astigmatism; and an optical sub-system along the path of said axial ray between the object surface and the combiner which at least partially compensates said axial coma and said axial astigmatism. Such a system is described in US Pat. No. 3940204.

It will be understood that in such a system the optical sub-system forms at the focal surface of the holographic combiner an aberrated intermediate image of the object surface; and that, by using aberrated wavefronts in the hologram construction, the holographic combiner is formed with aberrations balancing those of the intermediate image, the aberrations thus being at least partially compensatory so that a virtual image of the object surface at infinity is seen by an observer looking through the combiner from the exit pupil, which virtual image is of useful quality.

When such a system is used as a pilot's display system in an aircraft cockpit, to accommodate the system to the spatial constraints of the aircraft cockpit, the optical path between the object surface and the holographic combiner is folded by a reflector means whereby rays from the object surface are redirected at the exit of the optical sub-system to the combiner for reflection thereby to the exit pupil.

In known such arrangements, as are described in the aforementioned US Pat. No. 3940204, the reflector means comprises a prism which is positioned beneath the combiner, in line with the pilot ejection plane of the cockpit, so that there is no room available forward of the ejection plane to accommodate additional display arrangements such as a secondary head-down display arrangement.

SUMMARY OF THE INVENTION

It is an object of the present invention to provide a head-up display system of the kind specified whereby this disadvantage may be overcome.

According to the present invention, in a head-up display system of the kind specified including reflector means whereby rays from the object surface are redirected at the exit of the optical sub-system to the combiner said reflector means comprises: a light reflective first optical surface; and a second optical surface possessing both light reflective and light transmissive properties; the two said optical surfaces defining a space tapering in the direction of ray propagation from the object surface, and the arrangement being such that rays from the object surface are first reflected at said first surface to said second surface, are then reflected from said second surface back to said first surface, and are then reflected again at said first surface to said second surface, the rays consequently transmitted by said second surface being incident at the combiner at an angle to which the hologram of the combiner is tuned for reflection.

BRIEF DESCRIPTION OF THE DRAWING

One head-up display system in accordance with the invention will now be described, by way of example, with reference to the accompanying drawing which is a diagrammatic representation of a display unit of the system.

DETAILED DESCRIPTION OF THE PREFERRED EMBODIMENT

Referring to the figure, the display unit 11 is supported, boresighted, within an aircraft cockpit having a canopy 13, for use by the pilot of the aircraft. The unit 11 includes a housing 15 and a holographic combiner 17 which is upstandingly supported on top of the housing 15 in a rigid frame (not shown).

Within the housing 15 there is an optical sub-system 19 constituted by a multiplicity of lenses and other active optical elements, in two spaced groups 19a, 19b, respectively. The several such elements are supported at angles and with relative axial dispositions both to one another and in relation to the plane of the screen 21 of a cathode ray tube 23 so as to form at the exit of the optical sub-system 19 an aberrated intermediate image of a display on the cathode ray tube screen 21.

Along the optical path between the optical sub-system 19 and the combiner 17 there is provided in the housing 15 a reflector means 25 serving to fold the optical axis of the system from a generally horizontal direction to a generally vertical direction, and hence to direct rays from the exit of the optical sub-system 19 upwardly to the combiner 17.

The combiner 17 has a holographic reflection lens coating at the interface between two glass or plastics material elements 35, 37 respectively, providing flat and parallel fore and aft surfaces 39, 41, one on each of the glass elements 35, 37. Being holographic, the coating at the said interface is tuned both as regards wavelength and as regards angle of incidence of light rays at each point of its area.

Accordingly the cathode ray tube face 21 has a narrow waveband phosphor, typically a P45 phosphor, appropriate to the hologram wavelength.

The hologram of the combiner 17 is constructed using aberrated wavefronts so that its aberrations balance those of the intermediate image at the exit of the optical sub-system 19. As a result a clear visual image of the display on the cathode ray tube screen 21 at infinity is seen by the pilot looking through the combiner 17, superimposed on the pilot's view of the scene ahead of the aircraft through the combiner 17 and the cockpit canopy 13.

As so far described the unit is of the kind specified and disclosed in the above-mentioned US Patent Specification No. 3940204, to which reference should be made for details of the factors involved in the design and production of the optical sub-system 19 and the combiner 17.

In accordance with the present invention the reflector means 25 comprises a lower optically transparent planar member 27 provided with a fully reflective coating i.e. a fully silvered mirror coating, on a surface thereof and an upper optically transparent planar member 29 having a neutral density coating possessing both light reflective and light transmissive properties, i.e. a semi-silvered mirror coating, on a surface thereof. The members 27 and 29 are suitably made of plastics material or glass.

The members 27 and 29 define a space S tapering in the direction of ray propagation from the exit of the optical sub-system 19. The upper member 29 has its forward edge 31 in the direction of viewing by the pilot positioned below and immediately adjacent to the forward, i.e. lower, edge of the combiner 17 and its rearward edge 33 immediately adjacent to the rearward upper edge of the housing 15 and the corresponding edge of the member 27. The upper member 29 in consequence lies approximately in the plane of the upper side 15a of the housing 15 forming an exit aperture in the housing 15 for light passing from the screen 21 of the cathode ray tube 23 via the optical sub-system 19 to the combiner 17.

Ray paths through the display unit from the cathode ray tube screen 21 to the combiner 17 and from thence to the exit pupil E of the system are indicated in the drawing. As can be seen in the drawing, rays from the screen 21, after passing through the optical sub-system 19, are first reflected at the member 27 upwardly to the member 29. At the member 29 the rays are partially reflected back to the member 27 where they are again reflected by the member 27. The rays reaching the member 29 after such second reflection at the member 27 are partially transmitted by the member 29 and such rays are incident on the combiner 17 at an angle to which the hologram of the combiner 17 is tuned for reflection. Such rays are thus reflected to the exit pupil E of the display system to provide the pilot with a visual image at infinity of the display on the cathode ray tube screen 21, as described above.

It will be observed that, by virtue of the geometry of the reflector means 25 the housing 15 is strongly re-entrant from its rearward upper edge. A space is thereby created below the reflector means 25 for the accommodation of a secondary head-down display arrangement 45 at an ergonomically desirable position, with the entire display arrangement, that is the display arrangement 45 as well as the head-up display unit 11, accommodated forward of the pilot ejection plane P and above the pilot's knee plane K.

It will be appreciated that in view of the limited space in an aircraft cockpit, more particularly a combat aircraft cockpit, the provision of a head-up display system which allows an additional display to be placed in such an ergonomically desirable position is of great value.

The secondary display arrangement 45 shown in the drawing is a liquid crystal display arrangement incorporating a screen 47, electronics 49 for driving the liquid crystal display presented at the screen 47 and air cooling means 51. At its lower edge the display arrangement 45 is supported on a strut 53. However, it will be appreciated that other forms of secondary display arrangement may be used if desired.

It will be understood that whilst a system according to the invention is primarily intended for use as a pilot's display system in an aircraft cockpit, it may never-the-less find application in other environments where an additional display arrangement is required.

I claim:

1. A head-up display system comprising: an object surface (21); a holographic combiner (17) which has been constructed using two coherent sources respectively located adjacent to entrance and exit pupils of the combiner (17) so as to deviate an axial ray coming from the object surface through an off-axis angle into an exit pupil of the system and which has a focal surface with axial coma and axial astigmatism; an optical sub-system (19) along the path of said axial ray between the object surface (21) and the combiner (17) which at least partially compensates said axial coma and said axial astigmatism; and reflector means (25) whereby rays from the object surface (21) are redirected at the exit of the optical sub-system (19) to the combiner (17) for reflection thereby to the exit pupil; characterized in that said reflector means (25) comprises: a first reflective optical surface (27); and a second optical surface (29) possessing both light reflective and light transmissive properties; the two optical said surfaces (27, 29) defining a space (S) tapering in the direction of ray propagation from the object surface (21); and the arrangement being such that rays from the object surface (21) are first reflected at said first surface (27) to said second surface (29), are then reflected from said second surface (29) back to said first surface (27), and are then reflected again at said first surface (27) to said second surface (29), the rays consequently transmitted by said second surface (29) being incident at the combiner (17) at an angle to which the hologram of the combiner (17) is tuned for reflection.

2. A system according to claim 1 wherein said first and second surfaces (27, 29) are planar surfaces.

3. A system according to claim 1 wherein said first and second surfaces (27, 29) are each constituted by a coating on a surface of a member (27 or 29) of optically transparent material.

4. A system according to claim 3 wherein said coatings are silvered mirror coatings.

5. A system according to claim 1 wherein said optical sub-system (19) is disposed in a housing (15) with the combiner (17) disposed on one side of the housing (15) and said second surface (29) effectively forms an exit aperture in the housing (15) for light passing from the object surface (21) via the optical sub-system (19) to the combiner (17).

6. A system according to claim 5 wherein said second surface (29) lies substantially in the plane of the side (15a) of the housing (15) adjacent the combiner (17).

7. A system according to claim 5 wherein the forward edge of said second surface (29) in the direction of viewing of an observer using the system lies immediately adjacent the forward edge of the combiner (17).

8. A system according to claim 1 wherein the edges of said first and second surfaces (27, 29) remote from the optical sub-system (19) are immediately adjacent one another.

9. A system according to claim 1 in combination with an additional display arrangement (45) positioned on the side of said reflector means (25) remote from the combiner (17).

10. A system according to claim 1 in an aircraft cockpit for use as a pilot's head-up display system wherein said combiner (17) is positioned above said reflector means (25).

* * * * *